July 31, 1956

R. E. WATSON ET AL 2,756,876

HOLLOW METAL ARTICLES AND METHOD AND
APPARATUS FOR MAKING THE SAME

Filed Aug. 6, 1948

INVENTORS
R. ELDEN WATSON
JOHN R. BOSTON
CARL LEHMEIER
BY Justin W. Macklin
ATTY

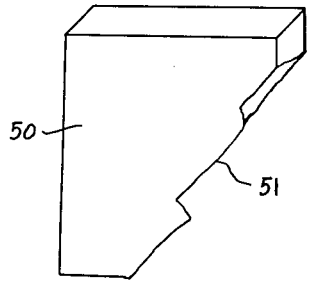
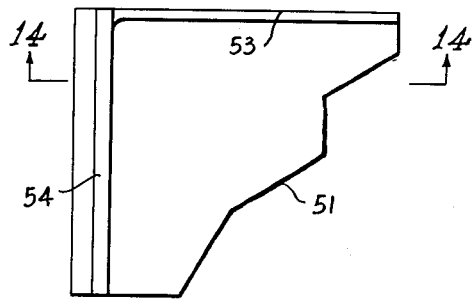
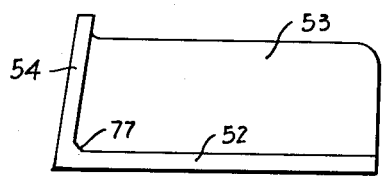
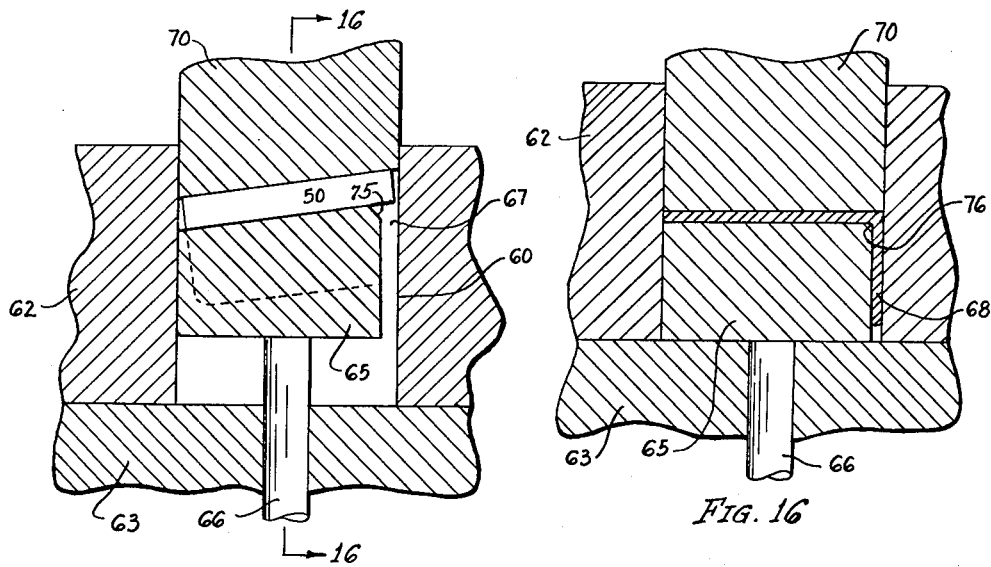
Fig. 12  Fig. 13  Fig. 14  Fig. 15  Fig. 16
INVENTORS
R. ELDEN WATSON
JOHN R. BOSTON
CARL LEHMEIER

INVENTORS
R. ELDEN WATSON
JOHN R. BOSTON
CARL LEHMEIER

United States Patent Office 2,756,876
Patented July 31, 1956

2,756,876

HOLLOW METAL ARTICLES AND METHOD AND APPARATUS FOR MAKING THE SAME

R. Elden Watson, Los Angeles, John R. Boston, West Los Angeles, and Carl F. Lehmeier, Santa Monica, Calif., assignors to Metalflo Corporation, a corporation of Nevada Application August 6, 1948, Serial No. 42,935

6 Claims. (Cl. 207—6)

This invention relates to the manufacture of hollow articles by cold flowing or impact forging.

Objects of the invention include the provision of methods and apparatus for effectively and economically forming articles of a wide variety of shapes and sizes by such cold flow or impact forging in a single operation or stroke.

The invention lends itself to the formation of annular hollow articles having one closed end and portions or segments of different thicknesses, and also our method and apparatus may be used for forming unsymmetrical pieces from single blanks, and which when formed may have two, three, or more integral planular walls of relatively different thicknesses.

A further object of our invention is to form such articles from blanks by such cold flowing of the metal with a single stroke of any suitable type of press.

By the terms "cold flowing" and "cold impact forging," as used herein, we intend to mean and include the forming and shaping of articles from blanks which may be at room temperature, or which may be heated to some temperature substantially below that of the usual hot forging temperatures.

In working with such metals as aluminum alloys, brass and copper, the blanks may be either at room temperature or may be heated to five or six hundred degrees Fahrenheit.

In the forming of such articles from the blanks, the metal is caused to flow under pressure, and this flowing movement includes the elongation of the slip-planes and crystalline structure comprising the blank, while controlling the amount and rate of flow of metal from the blanks into die spaces forming integral portions at an angle to the pressure surfaces.

In carrying out our present invention, we use essentially two elements, such as a die and a plunger, having parallel or more or less complementary pressure surfaces, which may be brought toward each other onto a blank. These elements also have surfaces extending longitudinally of the direction of their relative movement for forming the integral wall portions. The impact pressure first causes the material of the blank to become plastic and then forces or squeezes it outwardly from the body of the blank. The continued pressure and movement causes the material of the blank to be extruded or exuded from between the pressure surfaces, outwardly and then longitudinally along confining wall-forming surfaces. Thus the direction of the flow material is changed from that of moving outwardly from between the pressure surfaces engaging the blank, and into the confining and wall shaping surfaces at abrupt angles thereto. While the body of the blank material is thus being expressed and moved from between the compressing surfaces, it may be inhibited as it flows into a thick wall space while the flow into a thin wall space is relatively more free. As the material turns from between the pressure surfaces of the punch and die and moves outwardly from the body of the blank, we may govern the amount and rate of flow into thick and thin wall-forming surfaces.

Thus, while so forcibly flowing the metal the actual movement of a given crystalline structure, for example, or the end of a slip-plane, may be at the same rate for a thick wall as it is for a thin wall. Furthermore, we are able to so control the rate of flow from the body of the blank, between the pressure surfaces, as to simultaneously complete both a thick and a thin wall portion extending therefrom.

A piston comprising a head, side wall, and integral wrist-pin boss members projecting inwardly constitutes a good example of the use of our invention. In the formation of such a piston, a cylindrical blank of slightly less diameter than that of the finished piston blank is placed in a die having surfaces forming the head and outside wall surfaces of the piston blank. A punch member, having surfaces forming the inside of the head of the piston and having recesses for forming the inwardly projecting bosses, is forced against the blank in the die.

The first impact of pressure is sufficient to render the body of the blank plastic, and to cause it to spread radially and start to flow longitudinally along the die wall and the punch. Continued pressure and movement of the punch into the die causes the material of the body of the blank to flow outwardly and into the spaces forming the boss members and along the wall surfaces forming inside and outside of the piston wall or skirt.

As indicated, an object of the invention is to so control the rate of flow of the metal that the flow into the boss spaces may be at substantially the same rate at which the metal moves along the space forming the relatively thin side wall or skirt of the piston.

Without this controlling of the flow of the metal from the blank into the space between the punch and die, the metal would naturally flow more easily into the larger cross-sectional area of the boss cavities, while the flow into the relatively thin wall forming space would be restricted and slower. In fact, the flow into the boss cavities would be such that the outer head surface of the piston would show cavities or depressions in alignment with the boss spaces.

It has heretofore been considered practically impossible to so cold flow and form such a blank in a single stroke, and, in fact, it has been considered difficult to hot-forge such a blank, even with a number of progressive forging steps.

Thus it will be seen that the use of our invention for forming a piston of this character affords an illustration of meeting difficult conditions and requirements for controlling the flow from a blank and along a punch and into such thick and thin spaces at an angle to the pressure surfaces. It follows that an essential feature of our invention is to control the expression or extruding of the metal from the body of the blank into thick and thin formations, while causing the flow in directions parallel with the axis, or direction of motion of the punch into the die.

In the accompanying drawings, we have shown a piston and the punch and die construction for forming the same, and also have shown two walls formed on the side of a base integral therewith and of different thicknesses and height, by way of illustrating the wide variety of pieces which may be successfully formed by our method.

In the drawings, Fig. 1 is a plan view of the piston looking toward the inside of the same;

Figure 10:
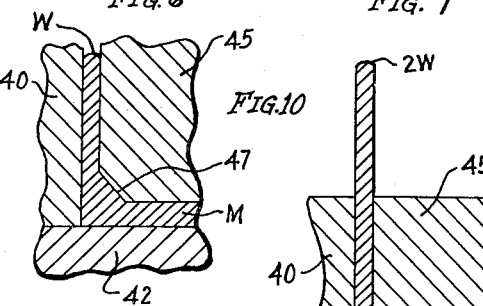
Figure 11:
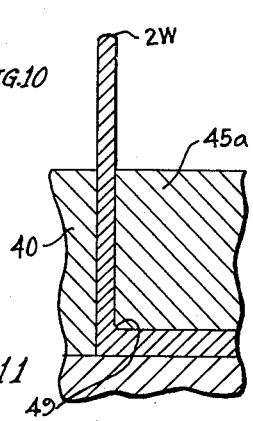
Figure 17:
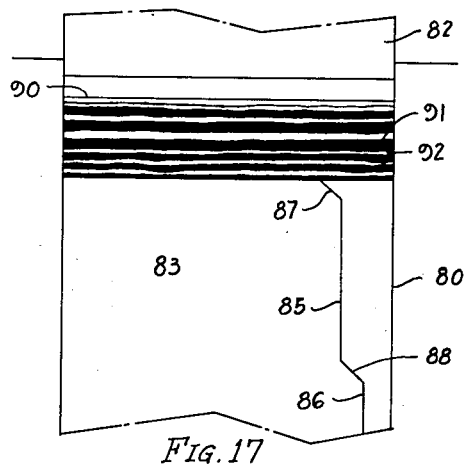
Figure 18:
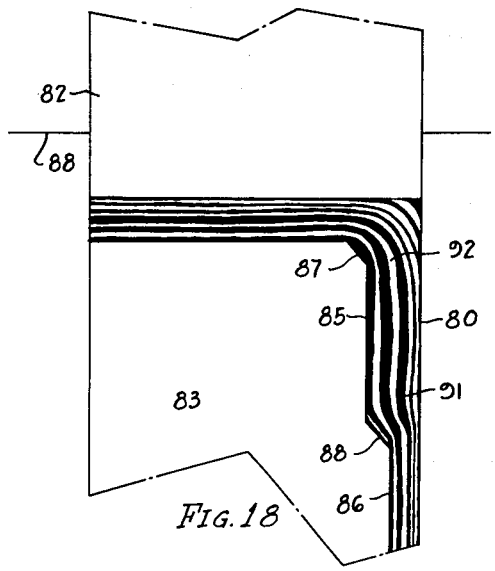
Figure 19:
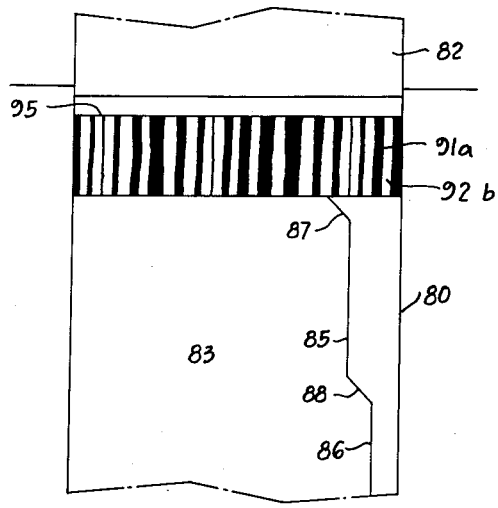
Figure 20:
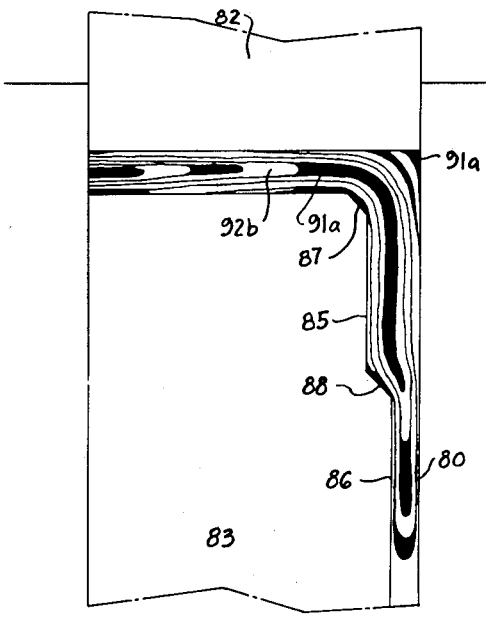

Figs. 10 and 11 each illustrates a corner or metal turning portion of the die and punch; Fig. 10 indicating the lesser height resulting from restricted flow over a beveled edge, while in the same die, with the same pressure, the same material will flow faster over a sharper edge and thus to a greater height, as indicated in Fig. 11;

Fig. 12 illustrates a blank which has two sides only of regular formation, and the other sides of which may be of any shape to suit a given finished piece;

Fig. 13 is a plan of an article having walls of different thickness and height formed from such a blank;

Fig. 14 is a section on the line 14—14 of Fig. 13;

Fig. 15 is a section through a die for forming the piece of Figs. 13 and 14, showing the blank in position and before applying the forming pressure;

Fig. 16 is a section taken at right angles to Fig. 15, showing the die and the thinner of the two walls after formation and prior to ejection;

Fig. 17 is a somewhat diagrammatic view illustrating the disposition of the slip-planes parallel with the upper and lower surfaces of a blank before forming;

Fig. 18 is a view illustrating the position of the slip-planes of the metal which has been caused to flow into a thicker portion and continued into a thinner portion of a side wall;

Fig. 19 is a view similar to Fig. 17 in which the slip-planes are transverse or normal to the upper and lower surfaces of the blank before forming;

Fig. 20 is a view similar to Fig. 18 showing the relative conditions and positions of the slip-planes after partial or complete reforming in the die.

Figure 1:
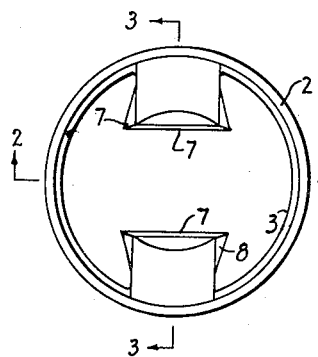
Figure 2:
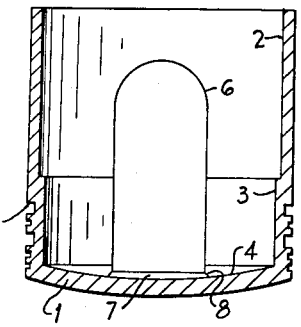
Fig. 2 is a transverse section in the line 2—2 of Fig. 1.
Figure 3:
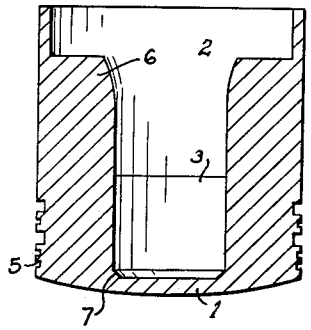
Fig. 3 is a section taken on a plane at right angles to Fig. 2, as indicated by line 3—3 of Fig. 1.

Referring particularly to Figs. 1, 2 and 3, the piston illustrated by way of example comprises a head portion 1 and an integral skirt 2, the walls of which are thickened for a portion of their length as indicated at 3 to permit machining of ring grooves indicated at 5. Formed integrally with the head and skirt are diametrically opposed wrist-pin bearing bosses 6 projecting a substantial distance inwardly from the side walls and extending along the skirt of the piston for one-half or more of its length. At the juncture between the bosses and the head are small but well-defined bevel portions 7 across the parallel inner faces, and similar bevels 8 at either side of the bosses taper and diminish in width toward the meeting of the surfaces of the sides of the bosses with the inner surfaces of the skirt portion 3. The importance of these bevels will appear in connection with the further illustration of the control of the flow of the material from a blank B into the shape of the piston, ready for the machining of its surfaces and ring grooves.

The punch and die construction, for forming such pistons, is shown as comprising a die plate 10 having a cylindrical cavity 12 corresponding in diameter to the outer surface of the piston and of a depth which may correspond to half or two-thirds or more of the axial length of the piston. A base plate 14 is fixed to the die member 10 and has a depressed surface 15 shaped to form the head or crown of the piston. The male portion of the die is shown as comprising a punch 20 having a cylindrical surface of a diameter slightly smaller than that of the inner surface 12 of the die, and having a reduced surface portion 23 adapted to form the thickened portion 3 of the wall of the piston. The inner end of the punch has an end surface 28 shaped to form the inner surface 4 of the piston head and is cut away at opposite sides to form recesses 26 for forming the wrist-pin bearing bosses 6.

Figure 4:
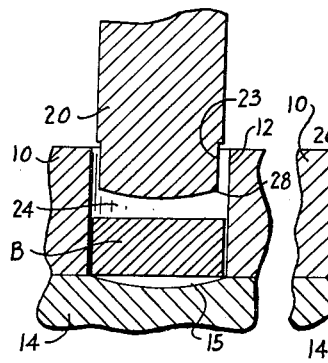
Figs. 4 and 5 are sections on a reduced scale corresponding to the planes of the sections of Figs. 2 and 3, and showing the punch and die with the blank in position prior to forming.
Figure 5:
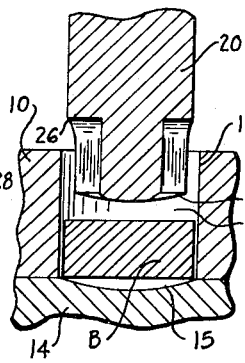

The blank B, of suitable metal, such as aluminum, may be a short cylinder of a diameter loosely fitting into the die cavity and having parallel top and bottom surfaces. As shown in Figs. 4 and 5, the punch is brought down into the die upon this blank. For this purpose any suitable single stroke press may be used.

Figure 6:
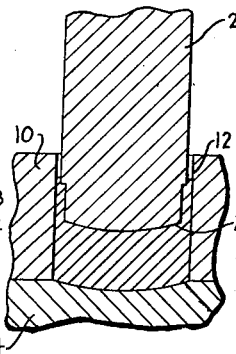
Figs. 6 and 7 are similar views showing the punch in a position approximately one-half way down in its forming movement.
Figure 7:
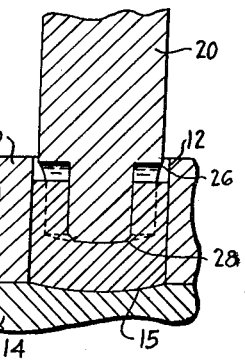

As the punch first engages the die, the effect of impact and pressure renders the material of the blank plastic, and as the punch progresses into the die the material flows upwardly—first forming the thickened portion 3 of the skirt, and, at the same time, starting the formation of the bosses 6 by flow of the metal of the blank into the cavities 26. This flow, by reason of slopes or bevels and of relatively sharp edges formed on the inner end of the punch at different portions of its perimeter, is so controlled that the metal moves longitudinally (upwardly as shown) at a substantially uniform rate of flow, so that the thin side walls and thick bosses rise evenly as indicated in the two cross sections of Figs. 6 and 7.

As the motion of the punch continues, the material fills the cavities 26 and the thinner wall portion 2 is formed by the continued and even rate of upward flow around the entire circumference. The position of the punch and die and the condition and shape of the metal at the finish of the pressure stroke is illustrated particularly in Figs. 8 and 9 which are sections through the die and piston blank taken on planes through the bosses and between the bosses, respectively. Here it will be seen that the juncture between the inner end of the punch and the cavity 26 is formed by an abrupt bevel 27, there being continuations 28 of such bevels at the sides of the mouths of cavities 26. These latter beveled edges 27 and 28 on the punch correspond respectively to the bevel portions 7 and 8 of the piston.

Thus as the metal flows over the bevels 27 and 28 into the cavity 26 for forming the thickened wrist-pin bearing bosses, it is relatively retarded, that is, the flow is resisted or held back so that the filling of this space will be at the same longitudinal or axial rate of flow as that of the thinner portion (or stream) of metal flowing over the relatively sharp edge 29 on the punch and forming the juncture between the inner surface 4 of the head and the inner surface of the thickened portion 3 of the skirt.

The flow of the metal around this sharper corner 29 has been found to be relatively easier and tends to be faster with the result that the narrow space forming the skirt of the piston fills—that is, metal flows into it along the punch—at the same rate that it is forced into and fills the cavity forming the thickened boss portions. Thus, as the punch reaches the point where the head 1 of the piston is of the desired thickness, the side walls forming the skirt have been projected upwardly above the cylindrical cavity 12 of the die 10 to a distance corresponding to the desired length of the piston skirt. In practice, the skirt thus formed is slightly longer than the skirt of the machined and finished piston.

It will be seen that if the metal of the blank B were allowed to flow with the same ease or facility into the cavities forming the thickened bosses that it is permitted to flow into the space forming the skirt, the result would be that the enlarged cavity would fill first and offer great resistance to further movement of the punch. This unbalancing of the longitudinal flow of the metal would also result in such a disruption or distortion of the slip-plane and crystalline structure as to form faults or defects in the finished piece.

From results accomplished it seems to be apparent that the applicants have discovered an unexpected function of the leading edges of the punch or male die member moving into the plastic material. In fact, it seems to be a phenomenon contradictory to the expected results. For example, it would naturally be assumed that a rounded edge such as that for forming a fillet of, say, an eighth of an inch or a quarter of an inch radius, would facilitate the flow of metal over a punch member having such a rounded edge surface, complementary to such a fillet.

Likewise it would be assumed that the metal of the blank being caused to flow around a sharp inside corner would encounter more resistance, and thus require greater pressure than when flowing over a rounded or beveled edge. By examining the pieces in various stages of partial formation, made by stopping the die at different parts of its forming movement and noting the effect of the bevel on the one portion of a die, and of a relatively sharp edge on another part of the same die, and around which the metal is also caused to flow on the same stroke, we have learned that a bevel of substantial size and at an angle, say, of about forty-five degrees, will increase resistance to the flow of the metal, while a relatively sharp edge or a narrower smaller bevel will offer less resistance.

In Fig. 10 is illustrated the effect of flow of the metal into a space between the die member 40 having an end plate 42, a punch member 45 provided with a bevel 47 (corresponding to the bevel 27). Here, the head of the punch and bottom of the die cavity are shown as parallel surfaces which have been brought together upon the metal M of a blank, and which has been forced to flow outwardly and upwardly into the space between the die 40 and punch 45 to form a wall W.

On a given movement of a punch having the bevel 47 at one part of its leading edge the metal will flow to a height of wall indicated at W in Fig. 10, the beveled surface 47 having an effect on this flow such that it is inhibited or relatively retarded as compared to the effect shown in Fig. 11. The same die 40 and punch 45a having a sharp edge such as 49, or with a minute bevel, if any, at another part of its leading edge under the same pressure (on the same movement) will cause the wall to rise to a greater height over this sharp edge, as indicated at 2W, in Fig. 11.

Figure 8:
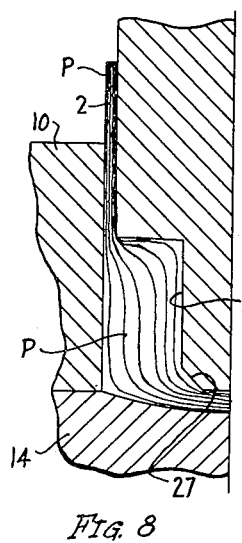
Figs. 8 and 9 are sections on an enlarged scale through the boss and thin wall portion, respectively, each showing one half of the piston only, and in which the metal of the formed piston is not sectioned, but lines indicating the slip-planes are used instead of section lines.
Figure 9:
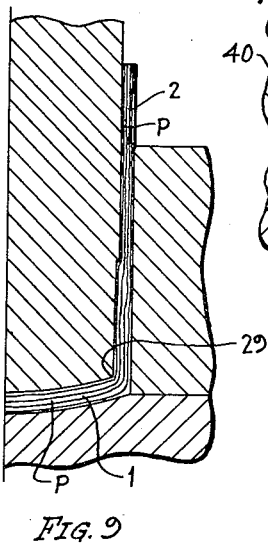

In Figs. 8 and 9, as stated, instead of sectioning the metal of the piston, lines P are used—illustrating the slip-plane flow and formation. It will be noted that the flow outwardly and then longitudinally (upwardly) first forms substantially uniform layers. These become somewhat thickened as indicated by the wider separation of the lines P in the boss-forming cavity 26, while beyond the boss these planes are turned and extended, being shown closer together in Fig. 8 to correspond substantially to the formation of these planes for the entire height of the skirt, as appears in Fig. 9. Further reference will be made to these slip-planes in connection with Figs. 17 to 20.

As stated, while the piston illustrates the control of flow for thick and thin integral sections, we are enabled to use our invention for a wide variety of forms of articles, and one of the most difficult types of formations has been that of irregular pieces having wall surfaces at abrupt angles and of different thicknesses and sometimes of different heights.

Another type very difficult to forge is that having a wall on one side only of the punch and die.

A still more difficult formation is that of two of the walls being formed at an acute angle between them. By our invention we are enabled to successfully form such parts with a single stroke of the forming members.

Referring to Figs. 12 to 16, 50 indicates a blank which may have two sides or edges of regular shape, and the other sides may be of any shape, and, accordingly, that portion of the blank is shown as broken away at 51.

The blank 50 as shown has its two regular sides at right angles and may have flat upper and lower faces. From such a blank we may forge the piece shown in Figs. 13 and 14 comprising a flat wall 52 from which rises a relatively thin wall 53 joined at the corner and integral with a wall 54, which is sloped to form an acute angle with the base portion 52. The wall 54 may be thicker than the wall 53 and of comparable thickness to the base portion 52, although these relationships of thickness and height, such as the wall 54 being higher than the wall 53, may be varied to suit many conditions and requirements.

In the forming of such a piece, a blank of suitable shape is placed within a cavity 60 in a die plate 62, shown as having a base plate 63. A movable anvil member 65 may be carried on a plunger 66 for ejecting the formed part. The lower surface of the member 65 is adapted to be brought against the top face of the base plate 63 in the position shown in Fig. 16 under the action of a punch member 70 and in which position the metal is caused to flow—first against the side surfaces of the cavity 60 and then downwardly into the spaces 67 and 68 between the anvil member 65 and parallel surfaces of the die member.

It will be noted that the slope of the upper surface of the anvil 65 with relation to the space 67 may cause the formation of the wall 54 to be that of the precise angle desired, whereas in the plane at right angles to Fig. 15 the parallel surfaces between the die and punch are relatively at right angles to the space 68 forming the wall 53.

Inasmuch as the space 67 is wider to form the thicker wall 54, it is necessary to prevent what would be a correspondingly more rapid flow of the metal into the space 67 than into the space 68. To accomplish this, the upper edge of the anvil adjacent to the space 67 is beveled as at 75—preferably at about a 45° angle—and of a sufficient width to effect the restricting or inhibiting of the flow toward the thicker space; while the corner of the anvil along the space 68 is comparatively sharp, having only a minute bevel as indicated at 76. The flow into these two spaces forming the walls 53 and 54 may be thus controlled so that on a single downward stroke of the punch the walls 53 and 54 may be formed. The walls may be the same heights, or one may be higher than the other, as shown.

If, for example, the piece shown in Figs. 13 and 14 were to have its two walls about four to five inches long and three-sixteenths and a quarter inch thick, respectively, a blank having parallel sides, and of suitable thickness to contain sufficient material to form the base 52 and side walls, may be thus formed on a single stroke, forcing the punch into the die by using a press of, say, from five to eight or nine hundred tons capacity.

As explained in connection with the expressing or extruding of the metal from between the pressure surfaces in connection with the formation of the piston, in the formation of parts such as those just described and of which Figs. 13 and 14 are an illustration, the slip-planes will be maintained in uniform relation while being elongated in the flow of the metal from the blank into the side walls forming spaces.

Considerable uniformity obtains whether the slip-planes are parallel with the pressure surfaces or are transverse thereto. As indicated, various studies of this effect have been made, and in Figs. 17 and 18 are shown the slip-planes of a blank and their condition in a base and connected wall formed by our method. In these figures the die and punch are indicated diagrammatically, the cavity having an inner surface 80 into which the punch 82 may move, while an anvil or forming member may have a pressure surface parallel with the face of the punch and a wall-forming surface indicated at 85 spaced from the surface 80. Here are shown two thicknesses of spacing, the one being at 85 and the other at 86 with flow inhibiting bevels 87 and 88.

The blank indicated 90, shown as having parallel top and bottom surfaces, is here indicated as having a slip-plane formation pictured by the heavy dark lines 91 and light spaces 92 therebetween.

As the punch moves toward the anvil 83 and the material is caused to flow into the space between the surfaces 80 and 85 over the bevel edge 87, the slip-planes retain their parallel relationship while being compressed between the pressure surfaces and are elongated to fill the space below the beveled edge. Further pressure may cause them to be compressed again as they pass the beveled shoulder 88 into a narrower space at the surface 86, the heavy dark lines and intervening light spaces indicating the continuity of these slip-planes is still preserved.

If the blank is formed by cutting off a bar of rolled stock, its slip-planes will normally be at right angles to the flat parallel surfaces of the blank which are subjected to the pressure surfaces of the punch 82 and anvil 83. Assuming that the space surfaces 85 and 86 are positioned with relation to the die surface 80, as before, when the punch 82 is brought downwardly, the material of the body of such a blank, here designated 95, moves toward the space for forming the connected wall, and the slip-planes indicated by the heavy lines 91a and light spaces 92b will become elongated to the right and downwardly as indicated in Fig. 20.

The flow seems to be comparable to that of squeezing a mass of plastic material from between its pressure-receiving surfaces, a crude simile for which may be that of squeezing the edible interior or pulp of a banana from its skin.

In practice, we have marked lines on the pressure-receiving surfaces of a blank and find these lines will remain substantially unmoved while the interior of the blank is caused to flow to form articles such as that of the piston or of the piece shown in Figs. 13 and 14.

We have produced unsymmetrical pieces such as shown in Figs. 17 to 20, and these have been made in large numbers, without injury to the die members.

Holding a blank between surfaces at an angle to the direction of closing or forming movement of the punch and die members, within limits of considerable slope, say, ten or even twenty degrees, has been accomplished without excessive side pressure upon the die and while still effecting the flow over forming surfaces at an acute angle.

In the making of all such pieces including those ranging from the piston illustration to the unsymmetrical articles, we have attained accuracy of the surfaces and desired dimensions and uniform crystalline structure. The disposition of the slip-planes of the material is to a large extent parallel to the surfaces of the article with the result that its physical characteristics are comparable to sheet stock or extruded material.

The corners as wells as the body portions of base and wall formations are free from defects and faults, and the surfaces are free from wrinkles or alligator skin effects.

The longitudinal flow may be controlled for the desired relative speeds in both thick and thin walls, while maintaining the uniform density, physical characteristics and surface accuracy. An example of an alloy from which the parts shown and described may be formed with dies constructed as described is an aluminum alloy of a type frequently used for pistons and commerically known as "14—SO." As stated, other non-ferrous alloys may be so formed. The time required for applying pressure effecting the necessary plasticity and reformation, flowing the metal into the finished shape, is of course only that time required for a single stroke at the usual speed of standard types of the presses. For example, the piston blank may be formed into the parts shown in a stroke occurring in a fraction of a second.

Various forms of pieces such as referred to have been made according to our invention in large number, and upon tests and studies by etchings and micro-photographs we have found such parts to be uniformly superior to similar parts formed by hot forging, cold forging, die casting, pressure casting, and different methods of molding.

Having thus described our invention, what we claim is:

1. A punch and die for forming piston blanks or like articles having an end wall, a relatively thin skirt portion and thickened wrist pin boss portions extending a major portion of the length of the wall at diametrically opposite positions and integral with the inner periphery of the skirt portion, and being adapted to effect the formation being effected in a single stroke operation by causing outward flow at the end portion of the cup-form piston while guiding and turning the outwardly flowing metal longitudinally with relation to the direction of pressure and while controlling the relative rate of volume of flow of metal by turning it into the thickened boss portion, first, at an acute angle, and, then longitudinally into the boss portions at the same longitudinal rate as the flow of the circumferentially intervening skirt portions, the punch and die comprising substantially parallel pressure surfaces for the closed end of the cup-form piston and the pressure surface of the punch being defined by a peripheral edge having different widths of bevel edged surfaces at the end of the punch, and inwardly extending recesses having surfaces to which the beveled edges lead in angular converging relation and which form the thickened bosses.

2. An apparatus for forming hollow articles by impact extrusion having a base and side wall, comprising means defining a die cavity delineating substantially the outer surface of the base and at least a portion of the wall of the completed article, a punch adapted to enter the cavity and having a pressure surface at the end and having longitudinal surfaces shaped to define the inner wall surface of the article, the spacing between the punch and die cavity differing at selected regions, at least one portion of the space constituting a three-sided recess forming a portion two or more times the thickness of the adjacent connecting wall portion and the pressure surface at the inner end of the punch having its edges beveled at said recesses for substantial amounts forming converging funnel-like surfaces for effecting a choking action on the flow of material and other portions of the edges of the inner end of the punch being formed relatively sharper and offering less choking action to the flow of the material, and whereby greater resistance to flow into the recess equalizes the longitudinal flow of material of the thick and thin wall portions as the punch moves into the die and whereby an article may be completely formed by extrusion and on a single stroke of the punch and at uniform rate of flow from the blank and until the formation of the completed wall.

3. The step of forming an article having a base portion and an integral side wall of relatively thick and thin portions, the step comprising pressing a metal blank in the direction normal to the slip-planes of its crystalline structure to displace the metal transversely of the direction of pressure and guiding the displaced and outwardly moving metal to cause it to turn into wall-forming spaces at an angle to the direction of pressure, and causing the slip-planes to align in substantial parallelism with the surfaces of said wall, while in turning of the metal from the outward flow normal to the direction of pressure to form both the thick and thin wall portions the metal forming the thick portion is caused to flow in converging paths over intermediate bevel surfaces formed across the corners of the punch between the base and walls to relatively inhibit the rate of flow into the thick portions.

4. A punch and die for forming an article having a base portion and relatively thick and thin side wall portions integral therewith, the punch having portions of its longitudinal surfaces spaced at different distances from the adjacent inner surfaces of the die, and the punch having an inner end pressure surface adapted to be brought against a blank in the die and having beveled portions at the perimeter of the end surface sloping a substantial transverse distance with relation to the width of the adjacent space and to the thickness of the adjacent portion of the wall to be formed for causing metal to flow in converging directions as it flows from the blank bodily into the thicker wall portion, the perimeter of the end of the die being formed to present a sharper edge over which metal may flow into the narrower space forming the thinner wall portion.

5. A method of forming an article having a base and integral wall portions formed of substantially different thicknesses at different portions of the perimeter of the base, the method comprising the step of pressing a metal blank between a punch and a die socket to reduce the thickness of the blank and cause the flow of metal from the body of the blank outwardly with relation to the punch and then along the wall of the punch and socket, and while causing metal flowing toward the thicker portions to abruptly converge and choke, effecting a retarding action of flow of metal into a greater space volume between the punch and die socket at the thicker wall portion, and also causing the flowing metal to turn over a sharper and more abrupt portion of the punch into the die socket for forming the thinner wall portion and thereby effecting the uniform longitudinal rate of flow of the material along the punch forming unbroken integral thick and thin wall portions.

6. An apparatus for forming piston blanks having a head portion, a skirt portion, and diametrically opposed substantially thickened wrist pin bosses integral with the skirt portion and extending from the head along the skirt a major portion of the longitudinal length thereof, the apparatus comprising a die having a cylindrical cavity, and a punch of a diameter smaller than the cavity by the amount of the thickness of said skirt portion of the piston and having an end pressure surface and cavities therein for forming said bosses, the cylindrical die surface being of such length as to extend longitudinally beyond the boss cavities of the punch at the completion of the stroke of the punch, sloping surfaces around the perimeters of the cavities at the inner pressure and impact end of the punch and having relatively sharper edges at the perimeter of the inner end of the punch extending between said cavities, whereby the punch may cause material of the blank to flow into the cavities and along the skirt at substantially the same rate.

References Cited in the file of this patent

UNITED STATES PATENTS

| | | |
|---|---|---|
| 2,024,285 | Handler | Dec. 17, 1935 |
| 2,244,954 | Lenz et al. | June 10, 1941 |
| 2,349,970 | Lambeek | May 30, 1944 |
| 2,465,792 | Davis | Mar. 29, 1949 |
| 2,533,942 | Jongedyk | Dec. 12, 1950 |

FOREIGN PATENTS

| | | |
|---|---|---|
| 870,997 | France | Apr. 1, 1942 |

OTHER REFERENCES

Cold Impact Extrusion of Aluminum Parts, July 1945 issue of Machinery, published by The Industrial Press, 148 Lafayette St., New York 13, New York.